United States Patent [19]

Seinecke

[11] 3,710,282

[45] Jan. 9, 1973

[54] ARRANGEMENT FOR THE DECREASE OF REFLECTION INTERFERENCES WITHIN NETWORKS FOR PULSE TRANSMISSIONS

[75] Inventor: Siegfried Seinecke, Soecking, Germany

[73] Assignee: Siemens Aktiengesellschaft

[22] Filed: April 29, 1971

[21] Appl. No.: 138,583

[30] Foreign Application Priority Data

May 13, 1970 Germany....................P 20 23 503.4

[52] U.S. Cl. ..........................333/8, 328/105, 333/9

[51] Int. Cl. ............................H03h 7/38, H01p 5/12

[58] Field of Search ..........307/244; 328/105, 54, 55; 333/8, 9, 32, 33

[56] References Cited

UNITED STATES PATENTS 3,324,421 6/1967 Fujimoto................................333/9

3,422,378 1/1969 LaRosa.............................333/33 X 2,148,098 2/1939 Bowman-Manifold..................333/8

*Primary Examiner*—Paul L. Gensler

*Attorney*—Hill, Sherman, Meroni, Gross & Simpson

[57] ABSTRACT

An arrangement for reducing reflection interference within a pulse transmission network which has a main transmission line and a plurality of branch transmission lines which are predominantly capacitively loaded wherein adjacent the connection of a branch transmission line to the main transmission line there is provided a resistor in series with the branch transmission line and having a resistance value equal to the wave resistance of the branch line minus half the wave resistance of the main transmission line.

1 Claim, 6 Drawing Figures

INVENTOR
Siegfried Seinecke
BY
Hill, Sherman, Meroni, Gross & Simpson
ATTYS.

INVENTOR
Siegfried Seinecke
BY
Hill, Sherman, Meroni, Gross & Simpson
ATTYS.

INVENTOR
Siegfried Seinecke
BY
Hill, Sherman, Meroni, Gross & Simpson
ATTYS.

ARRANGEMENT FOR THE DECREASE OF REFLECTION INTERFERENCES WITHIN NETWORKS FOR PULSE TRANSMISSIONS

BACKGROUND OF THE INVENTION

1. Field of the Invention

This invention relates to an arrangement for reducing reflection interferences within pulse transmission networks which consist of a main transmission line and a plurality of branch transmission lines branching off therefrom at a predominantly capacitively loaded end.

2. Description of the Prior Art

Pulse signals must be distributed in rapidly operating digital computers as free as possible of distortion over networks of wave conductors which consist, for example, of strip lines with defined wave resistance. A typical switching network of this type includes a gate which serves as a transmitter to a relatively long main transmission line having a particular wave resistance. The main transmission line is terminated at the end thereof, i.e., closed off with a resistor which is chosen to be equal to the wave resistance of the main transmission line. A plurality of branch lines are distributed along the main transmission line and each of the branch lines have a particular wave resistance. At the end of the branch lines, there are connected inputs to gating circuits which capacitively load the ends of the branch lines.

In many cases, the individual sections of the main transmission line between the branch transmission lines and the lengths of the branch transmission lines cannot be regarded as electrically short, i.e., the double line transit time is no longer small with respect to the rise time of the signals to be transmitted. Since each connected branch line forms an impulse point on the main transmission line, and since each branch transmission line is terminated at the end thereof with a small capacitance and at the beginning approximately with one-half the impedance of the main transmission line (error adaptation at both ends), there is a signal shift from the transmitter end of the line to effect multiple reflections at all the points of connection of the branch lines to the main transmission line and at all capacitively loaded ends of the branch lines, which multiple reflections can lead to severe distortion of the voltages at the inputs to the gating circuits. If such interferences arising through the distortions at the inputs of the gating circuits are to be kept smaller than the interference security of the switching circuits, then there are provided severe restrictions for the lengths of the branch lines, for the number of gate inputs at the end of the branch lines, and for the number and density of the connectible branch lines.

SUMMARY OF THE INVENTION

The primary objective of the invention therefore resides in providing an arrangement in which the lengths of the branch lines are no longer subject to restrictions and a denser arrangement of branch lines is possible on the main transmission line.

The foregoing objective is realized in that at the base point of each branch line, there is inserted a resistor in series with the branch line. The resistance of the inserted resistor is preferably chosen to be equal to the wave resistance of the branch line minus half the wave resistance of the main transmission line. The input of the branch line is therefore adapted for the voltage waves reflected at the end of the branch line.

BRIEF DESCRIPTION OF THE DRAWINGS

Other objects, features and advantages of the invention, its organization, construction and operation will be best understood from the following detailed description thereof taken in conjunction with the accompanying drawings, in which.

DESCRIPTION OF THE PREFERRED EMBODIMENT

Figure 1:
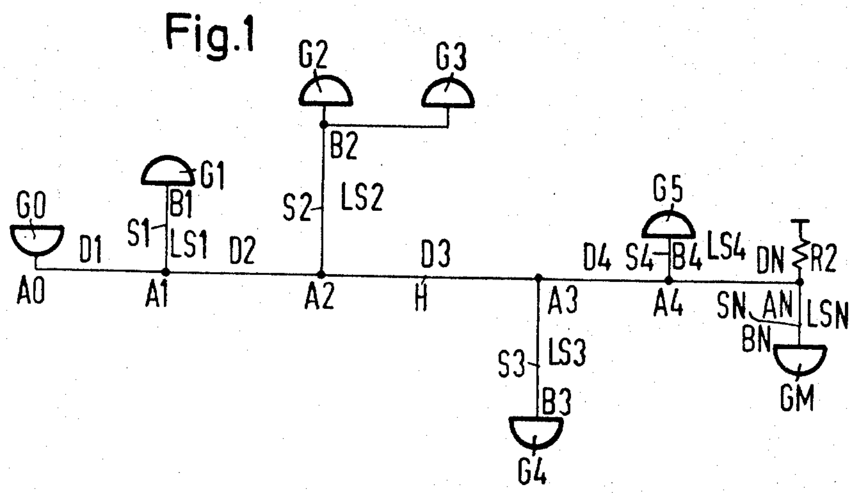
FIG. 1 is a schematic representation of a main transmission line having a plurality of branch transmission lines connected thereto.

A typical switching network is illustrated in FIG. 1. Here, the output of a gate GO drives, as a transmitter, a relatively long main transmission line H having a wave resistance ZH. The main transmission line H is closed off or terminated at the right hand end thereof with a resistor R2 which is chosen equal to the wave resistance ZH of the main transmission line H. Distributed along the main transmission line H is a plurality of branch transmission lines S1–SN, each having a wave resistance ZS. At the end of the branch transmission lines S1–SN, there is connected a plurality of inputs of gates G1 to GM. The gate inputs capacitively load the ends of the branch lines. Here, N and M are whole numbers.

In many cases of utilization, the individual sections D1 to DN of the main transmission line H and the lengths LS1 to LSN of the branch lines S1 to SN cannot be regarded as being electrically short, i.e., the double transit time is not small with respect to the rise time of the signals to be transmitted. As noted above, since each connected branch line S1 to SN forms an impulse point on the main transmission line H, and since each branch line S1 to SN is terminated at the end thereof with a small capacitance and at the beginning thereof with approximately one-half the impedance of the main transmission line, a signal jump proceeding from the transmitter gate GO causes multiple reflections at all the base points A1 to AN of the branch lines and all ends B1 to BM of the tap lines, which multiple reflections can lead to severe distortion of the voltages at the gate inputs. If these interferences which arise due to the distortions at the inputs of the gates are to be maintained at levels which are less than the interference security of the switching circuits, then severe restrictions are provided for the lengths of the branch lines LS1 to LSN, for the number of gate inputs at the end of the branch lines and for the number and density of the connectible branch lines.

Figures 2A, 2B:
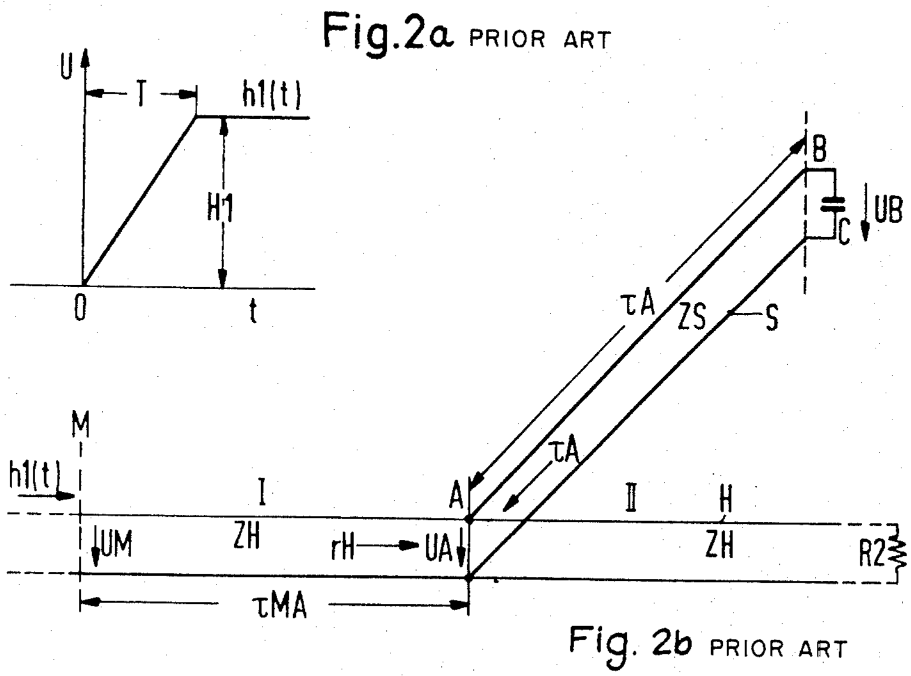
Fig.2a PRIOR ART, Fig. 2b PRIOR ART
FIG. 2*a* and 2*b* illustrate a wave characteristic on a time basis and a section of the main transmission line with a branch transmission line connected thereto in accordance with prior known techniques.

In the following discussion, the voltage relations in the main transmission line and a branch transmission line having no inserted resistance are compared with the voltage forms in a main transmission line and a branch transmission line having a resistance inserted in series therewith. The former is an uncompensated branch line and the latter is a compensated branch line. In FIG. 2*b*, the main transmission line H has the wave resistance ZH and is terminated with a resistance R2 which is equal to the wave resistance ZH. On the input of the main line H at the point M, there lies the voltage UM, which voltage is dependent on the wave *h*1 (*t*) delivered by the generator. This wave *h*1 (*t*) is to consist of a double ramp, such as is represented in FIG. 2*a*. Here, U designates voltage and *t* designates time.

The main transmission line H is subdivided into two sections I and II by means of the branch line S. On the base point A of the branch line S, there lies the voltage UA. The end of the branch line S, at point B, is loaded with a capacitance C, which capacitance develops the voltage UB. The wave resistance of the branch line S is ZS.

The wave *h*1 (*t*) requires the time τMA to pass from the point M to the point A. The time that the wave requires to travel from the point A to the point B is indicated with the reference τA.

The wave *h*1 (*t*) coming from the generator with the amplitude H1 and the rise time T on striking the base point A of the branch line S, undergoes a reflection according to $$rH=\frac{ZH//ZS-ZH}{ZH//ZS+ZH}$$

for the section I of the main resistance line H is terminated for this wave at the point A with the impedance ZH in parallel with the impedance ZS, as indicated by the symbol (//) in the foregoing equation.

A reflected wave of the amplitude *r*H·H1 propagates itself from *t* = τMA from the point A in both directions on the main transmission line H and on the branch line S and superimposes itself on the exciting wave *h*1. Therefore, a double ramp of the amplitude (1 + *r*H)·H1 travels onward toward the right hand side of the drawing on the main transmission line H.

The wave proceeding from a travel into the branch line S is likewise a double ramp with the amplitude (1 + *r*H)·H) When, at a later time equal to the transit time τA, therefore, at a point of time *t* = τMA + τA, the wave strikes the capacitance C at the end B of the branch line S, there is then released at that point a reflected wave UB*rf*1. The end value of the reflected wave UB*rf*1 is equal to (1 + *r*H)·H1, since after the recharging of the capacitor C, the end of the branch line is idle; therefore, there takes place a total reflection of +1.

The wave UB*rf*1, after a further transit time τA, at a point in time *t* = τMA + 2 τA, therefore reaches the base point A of the branch line S. The reflection factor *r*A then amounts to $$rA=\frac{\frac{ZH}{2}-ZS}{\frac{ZH}{2}+ZS}$$

The reflected wave UB*rf*1 coming from the end B of the branch line S is reflected at the base point A of the branch line S, particularly with the reflection factor *r*A. The reflected wave UA*rf*1 at the base point A is equal to *r*A·UB*rf*1. It travels back to the end of the branch line. Simultaneously on the main transmission line H, there is propagated to both sides the wave (1 + *ra*)·UB *rf*1.

Figure 3:
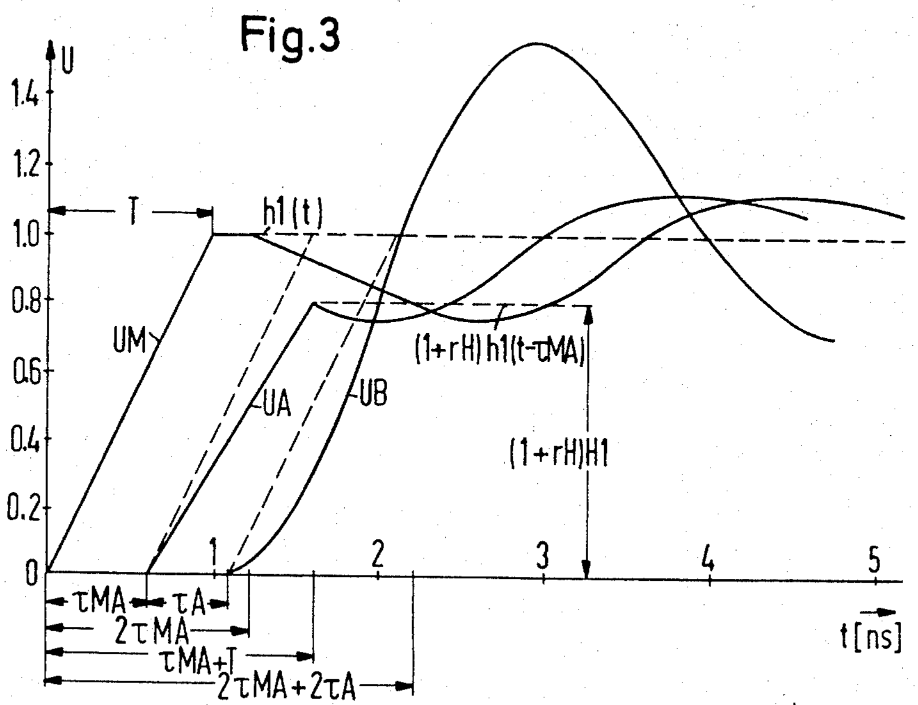
FIG. 3 is a graphical representation of the voltages at particular points of the circuit illustrated in FIG. 2.

After a time that is greater than τMA + 3τA, the reflections at the end B of the branch line and at the base point A of the branch line are repeated. In the process the amplitudes decay in accordance with the factor *r*A <1, in consequence of repeated weakening. The voltages at the points M, A and B, therefore, are severely distorted, since they are provided from the superposition of all these partial waves. The distortions increase as the length of the branch lines increase and as the load increases. In FIG. 3, the voltage courses at the points M, A and B are shown. The voltage U is plotted with respect to time *t*. In FIG. 3, the wave resistance ZH of the main transmission line H is equal to 50 ohms, the wave resistance ZS of the branch line S is equal to 100 ohms, the amplitude H1 of the wave *h*1 (*t*) is equal to 1, the rise time T of the double ramp is equal to 1 ns, the transit time τMA is equal to 0.6 ns and the transit time τA is equal to 0.5 ns as a practical example.

The voltage UM reaches first of all 100 percent of the amplitude H1 of the exciting wave *h*1 (*t*). In the time interval of 2τMA <*t*<2τMA + T there takes place, in consequence of superposition of the reflection *r*H·*h*1 at the base point A, a linear rise to 80 percent of the value of H1. From the time *t*>2τMA + 2τA, the reflection from the end B of the branch line begins to have an effect. There takes place a further invasion of up to 75 percent of H1. Later, there is shown a high increase of the voltage UM up to 114 percent of H1. The voltage UM then pendulates to the end value.

The voltage UB at the end of the branch line shows at first a high increase of 154 percent of H1, then shows a dip to 70 percent of H1, and finally a slow swing-in toward the end value.

The voltage UA at the base point A of the branch line S yields first of all a linear rise to 80 percent of H1, then a recession to 75 percent of H1, followed by a overshoot to 112 percent of H1, and finally a slow swing-in toward the value H1. The wave travelling onward toward the right on the main transmission line H has the form of UA.

Figure 4:
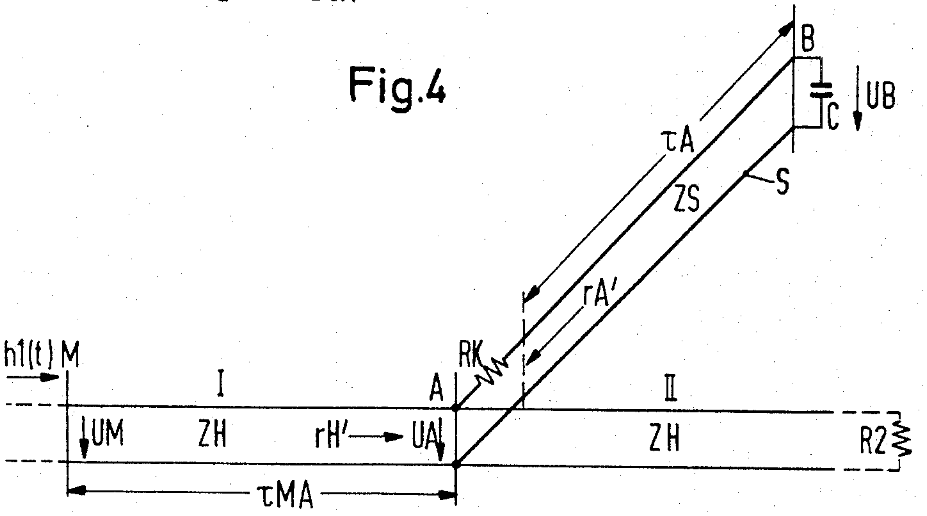
FIG. 4 illustrates a section of a main transmission line having a branch line in which there is inserted a series resistor in accordance with the principles of the present invention.

FIG. 4 illustrates the compensated branch line. The references correspond to those of FIG. 2. The difference with respect to FIG. 2 resides in the provision of a series resistor RK in the branch line S adjacent the base point A. With this series resistance the reflection factors *r*H for the waves from the generator and *r*A for the waves from the end B are changed at the base point A.

In the particular example set forth herein, there is chosen a resistance value for the resistor RK of the magnitude $RK = ZS - ZH/2$. In place of the reflection factor *r*H for an uncompensated line, there is then provided the smaller reflection factor $$rH'=\frac{(RK+ZS)//ZH-ZS}{(RK+ZS)//ZH+ZS}$$

At the base point A, the main transmission line H is no longer disturbed by the parallel connected impedance ZS, but now only by the higher impedance ZS + RK.

The branch line S is not excited by a first wave of the amplitude (1 + rH)·H1 as in the case of the uncompensated line, but by a wave of the smaller amplitude $$\frac{(1+rH1)H1-ZS}{RK+ZS}=0.5H1$$

Therefore, there exists a voltage division between the wave impedance ZS and the resistance RK.

The first reflected wave UBrf1 at the end B of the branch line S has, after expiration of a swing-in process, the end value of 0.5 H1. If it returns, in the time interval $\tau$MA + $\tau$A < t < $\tau$MA + 2$\tau$A, to the beginning of the branch line, it then strikes an impedance $RK + ZH/2 = ZS$. The line is therefore adjusted for the waves travelling from the end B to the end A of the branch line S. On the branch line S, accordingly, after elapse of a time interval 2$\tau$A, no further reflections occur; accordingly, the voltage UB at the end of the branch line tends to rise monotonically toward its end value.

For the first and only reflection at the end B of the branch line S, there appears on the main transmission line A only the constituent $$0.5H1\cdot\frac{2\cdot\frac{ZH}{2}}{ZS+\frac{ZH}{2}+RK}$$

The voltage form on the end B of the branch line S and the magnitude of the constituent striking the main transmission line H of the first and only reflection on the end B are entirely independent of the length of the branch line — i.e., even great lengths of the branch line are permitted.

Since the reflection factor rH' is smaller than the reflection factor rH, a greater constituent, namely 1 + rH' of the exciting wave travels onward to the right on the main transmission line H. Simultaneously, the voltage at the base point A of the branch line S reaches 50 percent of the value of H1 at an earlier point in time.

Figure 5:
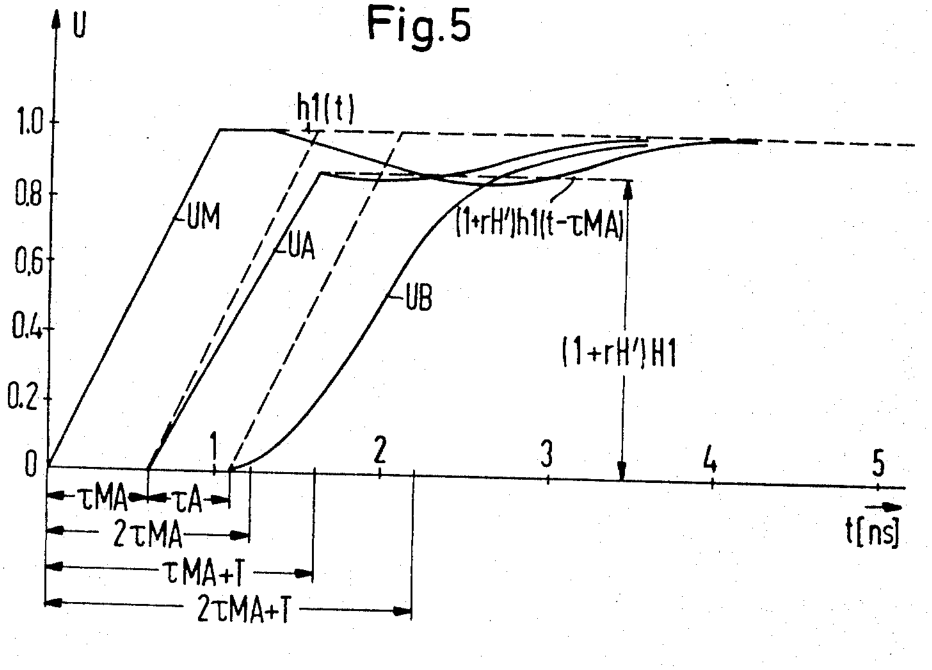
FIG. 5 is a graphical illustration of voltages at certain points in the circuit of FIG. 4.

FIG. 5 illustrates the voltage courses in a compensated branch line. The magnitudes of ZH, ZS, H1, $\tau$MA, T, $\tau$A correspond to that referred to with respect to FIG. 3. The resistor RK is provided from the values of ZH and ZS as 75 ohms.

In FIG. 5, $h1\ (t)$ and $(1 + rH')\cdot h1\ (t - \tau MA)$ are the course of the double ramp signal without influence through the reflection of the end of the branch line.

The voltage UM, in consequence of the reflection at the base point A of the branch line S, dips to only 87.5 percent of H1, thereupon a further deflection downward follows in consequence of the reflection at the end of the branch line to 85.5 percent of H1. The voltage UM then rises monotonically to 100 percent. The voltage UB, as already explained above, as a monotonic rise to 100 percent H1.

The voltage UA first rises linearly to 87.5 percent of H1, and is then, in consequence of the reflection at the end B of the branch line S deflected to 85.5 percent H1 and finally monotonically approaches 100 percent H1.

If the magnitudes indicated with respect to FIG. 3 are substituted in the relationships for the reflection factors, the following results are yielded: rH = −0.2; rH' = −0.125 for the reflection factors at the point A on the main line H; rA = −0.6; rA' = 0 for the reflection factors at the base point of the branch line. From these values, it is clearly evident that through the insertion of the resistor RK at the base point of the branch line, the distortion of the exciting wave becomes smaller.

The advantages of the arrangement according to the present invention reside in that:

1. The reflection which the branch line causes on the main line is reduced;

2. The additional signal delay on the main line arising in consequence of the connection of the branch line becomes less (at the base point of the branch line and all points following thereupon of the main line the signal reaches the 50 percent value earlier);

3. The waves which travel from the end of the branch line to the base point see the wave resistance of the branch lines (adaption of the wave resistance to the beginning of the branch line), and the build up process is therefore completed after one transit in the outgoing direction and one return, the signal at the end of the branch line tends to rise monotonically toward its stationary end value (no overshoot and voltage break-in), and the voltage course at the beginning of a branch line is, accordingly, entirely independent of the length of the branch line;

4. With a given rise time and interference security of the gate switching circuits, there can be permitted considerably greater capacitive loads, for example, a larger number of gate inputs, at the end of the branch line;

5. The branch line length can be chosen arbitrarily great; and

6. The tap lines can be arranged in a denser sequence along the main line.

While I have disclosed my invention by reference to a particular illustrative embodiment thereof, many other changes and modifications may be made in the invention by one skilled in the art without departing from the spirit and scope of my invention and it is to be understood that I intend to include within the patent warranted hereon all such changes and modifications as may reasonably and properly be included within the scope of my contribution to the art.

I claim:

1. In a pulse transmission network of the type which has a main transmission line and a plurality of branch lines connected thereto which are predominantly capacitively loaded at their distal ends, the improvement therein for reducing reflection interference comprising the provision of a resistor in series with each branch line adjacent its connection to the main line, each said resistor having a resistance value which is equal to the wave resistance of its branch line minus half the wave resistance of the main line.

* * * * *

UNITED STATES PATENT OFFICE
CERTIFICATE OF CORRECTION

Patent No. 3,710,282 Dated January 9, 1973

Inventor(s) Siegfried Seinecke

It is certified that error appears in the above-identified patent and that said Letters Patent are hereby corrected as shown below:

Column 3, lines 49 and 50 and column 4, line 13, "(1 + rH).H)" and "rA <1" should read -- (1 + rH)·H1. -- and -- /rA/ <1 --.

Signed and sealed this 19th day of March 1974.

(SEAL)
Attest:

EDWARD M.FLETCHER,JR.
Attesting Officer

C. MARSHALL DANN
Commissioner of Patents